United States Patent [19]

Ruiz

[11] Patent Number: 5,406,694
[45] Date of Patent: Apr. 18, 1995

[54] SCALABLE METHOD OF FABRICATING THIN-FILM SLIDERS

[75] Inventor: Miguel A. Ruiz, Arvada, Colo.

[73] Assignee: Rocky Mountain Magnetics, Inc., Louisville, Colo.

[21] Appl. No.: 157,806

[22] Filed: Nov. 24, 1993

[51] Int. Cl.$^6$ ............................................. G11B 5/127
[52] U.S. Cl. ........................................ 29/603; 29/423; 29/559
[58] Field of Search ................... 29/603, 423, 424, 559

[56] References Cited

U.S. PATENT DOCUMENTS

| | | | |
|---|---|---|---|
| 4,134,801 | 1/1979 | Hofer et al. | 204/15 |
| 4,675,986 | 6/1987 | Yen | 29/603 |
| 4,689,877 | 9/1987 | Church | 29/603 |
| 4,912,883 | 4/1990 | Chang et al. | 51/165 |
| 4,914,868 | 4/1990 | Church et al. | 51/165.71 |
| 5,095,613 | 3/1992 | Hussinger et al. | 29/603 |

*Primary Examiner*—Carl E. Hall
*Attorney, Agent, or Firm*—David B. Harrison

[57] ABSTRACT

A method of fabricating thin-film magnetic recording heads or "sliders" employs the step of slicing a wafer containing like-oriented transducers into chunks, each chunk containing at least a minimum number of rows of transducers such that the amount of bow induced in the chunk is minimized. Following the chunk slice, one of two methods may be followed to yield precisely-lapped single rows of sliders. In the first method, the chunk is bonded to a rigid support piece at one end, and to a rigid carrier tool at the other. The row bonded to the carrier is then sliced away from the chunk and lapped while attached to the carrier. The steps of bonding, slicing, and lapping are then repeated for each row in the chunk. In the second method, the chunk is bonded to a rigid carrier tool at one end, and the row at the other end is then lapped and sliced off. The steps of lapping and slicing are repeated for each row in the chunk. In either method, rows are never lapped before being separated from a rigid workpiece, so that additional bow is not introduced prior to lapping the row.

11 Claims, 5 Drawing Sheets

FORM FACTOR 70.00%

| ROW LENGTH (IN.) | ROWS PER CHUNK | | | | | | | | | |
|---|---|---|---|---|---|---|---|---|---|---|
| | 1 | 2 | 3 | 4 | 5 | 6 | 7 | 8 | 9 | 10 |
| 1.25 | 0.359 | 0.181 | 0.115 | 0.091 | 0.082 | 0.079 | 0.078 | 0.077 | 0.077 | 0.077 |
| 1.50 | 0.440 | 0.214 | 0.131 | 0.100 | 0.089 | 0.084 | 0.083 | 0.082 | 0.082 | 0.082 |
| 1.75 | 0.522 | 0.247 | 0.146 | 0.109 | 0.095 | 0.090 | 0.088 | 0.088 | 0.087 | 0.087 |
| 2.00 | 0.603 | 0.280 | 0.162 | 0.118 | 0.102 | 0.096 | 0.094 | 0.093 | 0.093 | 0.092 |
| 2.25 | 0.684 | 0.313 | 0.177 | 0.127 | 0.108 | 0.101 | 0.099 | 0.098 | 0.098 | 0.098 |
| 2.50 | 0.766 | 0.347 | 0.192 | 0.136 | 0.115 | 0.107 | 0.104 | 0.103 | 0.103 | 0.103 |
| 2.75 | 0.847 | 0.380 | 0.208 | 0.145 | 0.121 | 0.113 | 0.110 | 0.109 | 0.108 | 0.108 |
| 3.00 | 0.928 | 0.413 | 0.223 | 0.154 | 0.128 | 0.119 | 0.115 | 0.114 | 0.113 | 0.113 |

FORM FACTOR 50.00%

| ROW LENGTH (IN.) | ROWS PER CHUNK | | | | | | | | | |
|---|---|---|---|---|---|---|---|---|---|---|
| | 1 | 2 | 3 | 4 | 5 | 6 | 7 | 8 | 9 | 10 |
| 1.25 | 0.522 | 0.247 | 0.146 | 0.109 | 0.095 | 0.090 | 0.088 | 0.088 | 0.087 | 0.087 |
| 1.50 | 0.636 | 0.294 | 0.168 | 0.121 | 0.104 | 0.098 | 0.096 | 0.095 | 0.095 | 0.095 |
| 1.75 | 0.749 | 0.340 | 0.189 | 0.134 | 0.114 | 0.106 | 0.103 | 0.102 | 0.102 | 0.102 |
| 2.00 | 0.863 | 0.387 | 0.211 | 0.147 | 0.123 | 0.114 | 0.111 | 0.110 | 0.109 | 0.109 |
| 2.25 | 0.977 | 0.433 | 0.233 | 0.159 | 0.132 | 0.122 | 0.118 | 0.117 | 0.116 | 0.116 |
| 2.50 | 1.091 | 0.480 | 0.254 | 0.172 | 0.141 | 0.130 | 0.126 | 0.124 | 0.124 | 0.124 |
| 2.75 | 1.205 | 0.526 | 0.276 | 0.184 | 0.150 | 0.138 | 0.133 | 0.132 | 0.131 | 0.131 |
| 3.00 | 1.319 | 0.573 | 0.298 | 0.197 | 0.160 | 0.146 | 0.141 | 0.139 | 0.138 | 0.138 |

FORM FACTOR 35.00%

| ROW LENGTH (IN.) | ROWS PER CHUNK | | | | | | | | | |
|---|---|---|---|---|---|---|---|---|---|---|
| | 1 | 2 | 3 | 4 | 5 | 6 | 7 | 8 | 9 | 10 |
| 1.25 | 0.766 | 0.347 | 0.192 | 0.136 | 0.115 | 0.107 | 0.104 | 0.103 | 0.103 | 0.103 |
| 1.50 | 0.928 | 0.413 | 0.223 | 0.154 | 0.128 | 0.119 | 0.115 | 0.114 | 0.113 | 0.113 |
| 1.75 | 1.091 | 0.480 | 0.254 | 0.172 | 0.141 | 0.130 | 0.126 | 0.124 | 0.124 | 0.124 |
| 2.00 | 1.254 | 0.546 | 0.285 | 0.190 | 0.154 | 0.141 | 0.137 | 0.135 | 0.134 | 0.134 |
| 2.25 | 1.417 | 0.612 | 0.316 | 0.207 | 0.167 | 0.153 | 0.147 | 0.145 | 0.145 | 0.144 |
| 2.50 | 1.579 | 0.679 | 0.347 | 0.225 | 0.181 | 0.164 | 0.158 | 0.156 | 0.155 | 0.155 |
| 2.75 | 1.742 | 0.745 | 0.378 | 0.243 | 0.194 | 0.175 | 0.169 | 0.166 | 0.165 | 0.165 |
| 3.00 | 1.905 | 0.812 | 0.409 | 0.261 | 0.207 | 0.187 | 0.179 | 0.177 | 0.176 | 0.175 |

FIG. 5

SCALABLE METHOD OF FABRICATING THIN-FILM SLIDERS

FIELD OF THE INVENTION

The invention relates to the fabrication of thin-film magnetic recording heads of the type used in disk drives.

BACKGROUND OF THE INVENTION

In magnetic disk drive systems, data is written to and read from magnetic disks contained therein. Typically, the disk is mounted on a spindle such that the disk can rotate to permit an electromagnetic head mounted on a movable arm positioned near the disk's surface to read or write information on the disk.

During operation, the system moves the head to a desired radial position on the surface of the rotating disk where the head electromagnetically reads or writes data. Usually, the head is integral part of a carrier called a "slider". A slider generally serves to mechanically support the head and any electrical connections between the head and the rest of the drive system.

The slider is aerodynamically shaped to glide over moving air, so that it generally maintains a uniform distance from the surface of the rotating disk and does not undesirably contact the disk.

A slider is typically formed with two parallel rails and a recessed area between the rails. The surface of each rail that glides over the disk surface during operation is known as the "air-bearing surface". The head contains magnetic poles that terminate at the air bearing surface; these poles function to interact with the magnetically-recorded information on the disk during operation. The tip portions of the poles are parallel and separated by a magnetically insulating region called the "throat". The length of this throat region, which is commonly referred to as the "throat height" of the head, must be exact to within very strict tolerances in order to achieve maximum performance of the head. Accordingly, thin-film head fabrication techniques generally provide for precise control of final throat height.

Thin-film sliders are commonly fabricated from a single wafer upon which an array of transducers is formed using known wafer-processing techniques. After formation of the transducers, their pole portions and throat regions lie in the plane of the wafer. During subsequent processing steps, individual sliders are separated from the wafer, exposing the air-bearing surface of each slider that lies in a plane perpendicular to the plane of the wafer. The pole portions of each transducer terminates at the air-bearing surface of the corresponding slider. The air-bearing surface is then finely lapped to bring the throat height to the proper value.

It is common to arrange the sliders in parallel rows upon the wafer, and to subsequently slice the wafer into separate rows for further machining. For example, each sliced row can be temporarily bonded to a rigid carrier tool in preparation for lapping. This row-tool combination can then be held in a fixture during the lapping process, and upon completion the row can be sliced into individual sliders and debonded from the tool. It is also common to incorporate features known as "lapping guides" on each row that are monitored during the lapping process to determine when lapping should be terminated. These lapping guides are typically electrical circuits whose behavior changes as lapping progresses. For example, the lapping guides may incorporate a set of switches that open progressively as material is removed.

While the above-described fabrication technique is fairly simple, it suffers from a serious problem that is commonly referred to as "row bow" or simply "bow". If the row being lapped is not flat, then the sliders in a row will not be lapped by the same amount. As a result, the throat heights of the sliders in the row will deviate substantially from the desired throat height. If the bow is sufficiently severe, this uneven lapping will result in poor yield, because many of the resulting heads will either not function or will fail to meet operating specifications. The problem of row bow, then, must be accounted for in thin-film head fabrication processes.

It should be noted that there are other factors that contribute to final throat height deviation. For example, imperfections in the mechanics of lapping machinery introduce deviation at the lapping stage. Also, imprecise lap guide positioning with respect to the plane of the throats during wafer deposition can also cause throat height errors. However, row bow as described has been the dominant factor, and it this problem in particular that the present invention addresses.

Several approaches to eliminating or reducing row bow are shown in U.S. Pat. No. 5,095,613, entitled "Thin Film Head Slider Fabrication Process", by Hussinger et al., issued Mar. 17, 1992 and assigned to Digital Equipment Corporation. For example, in the process of FIG. 3 of that patent, each row of sliders is lapped while still attached to the wafer. This of course provides for great accuracy, because the rows can be formed very straight on the wafer, and it is practically impossible for "bow" to occur in the plane of the wafer. In the process of FIG. 7, a rigid carrier tool is bonded to a row while it is still part of the wafer, and then the row is sliced off. This technique ensures that the row is always backed by a straight, rigid object, so that little or no bow can be introduced therein. Finally, FIGS. 9 through 11 show techniques wherein the wafer is sliced into 2-row bars, the rows in each bar facing either toward or away from each other. These 2-row bars are described as being substantially stiffer than single-row bars, so that they are less likely to bow. The 2-row bars are bonded to rigid carriers, sliced, and lapped.

While the techniques shown in the Hussinger patent clearly reduce harmful rowbow, they also have some practical drawbacks or limitations. For example, the processes of FIGS. 3 and 7 require that an entire wafer be used during the slicing and lapping processes. The portion of the wafer that is not being processed, which of course is all of the wafer except for one row, constitutes excessive "work in progress" or WIP. This term refers to the amount of intermediate work material that must be created before finished material can result. The larger the amount of WIP, the less efficient the fabrication process is. Generally, as the amount of WIP increases, the overall time from starting a wafer to packaging a finished head increases. Also, when process defects are detected, especially those occurring in the beginning process stages such as wafer fabrication, much or all of the WIP must be scrapped. It is therefore generally desirable to minimize the amount of WIP in a fabrication process. But the processes of FIGS. 3 and 7 of Hussinger actually increase the amount of WIP over more conventional thin-film head fabrication techniques.

Hussinger teaches, in connection with the processes of FIGS. 9-11, that 2-row bars are substantially stiffer than single-row bars, and then shows two distinct ways of processing 2-row bars. In one method, the rows are formed on the wafer to face each other. Two rigid carrier tools are attached to the outside surfaces, then the rows are split apart and lapped separately. In the other method, the rows are formed to face away from each other. Then a somewhat complex series of tool bonding/debonding, slicing, and lapping steps is performed.

Both of these techniques of Hussinger rely on an unusual row orientation, where alternating rows face in opposite directions. The first technique can apparently be used only with 2-row bars wherein the rows face each other, and the second technique similarly relies on having only 2 rows in a bar. Hussinger teaches that having 2 rows in a bar is sufficient to overcome bow, and mentions no conditions under which this might not be true. The limitations in Hussinger's processes are therefore consistent with Hussinger's view that slicing the wafer into 2-row bars is a general solution to the bowing problem.

SUMMARY OF THE INVENTION

The applicant has recognized the above-mentioned drawbacks of prior slider fabrication techniques, and has also discovered that the use of 2-row bars to solve the row bow problem is also limited. Sliders are made in a number of standard "form factors", each representing a corresponding fraction by which slider dimensions are reduced from a standard size. 2-row bars of sliders, despite being thicker than single-row bars, may experience an unacceptably large amount of bowing, particularly 2-row bars of smaller form factor sliders. A 2-row bar of smaller sliders is thinner than a 2-row bar of standard-sized sliders. Since the thickness of the bar is one important factor in determining the amount of bow, a 2-row bar of smaller form factor sliders tends to experience greater bow than a 2-row bar of standard-sized sliders.

It is therefore an object of the invention to enable the processing of bars having an arbitrary number of rows. By doing so, the bar's thickness may be adjusted as required, so that the amount of bow can be held to an acceptable value regardless of the dimensions and tolerances of the transducers being fabricated. The method may thus be used to fabricate sliders of any form factor, and is thus "scalable" as slider sizes decrease. It is also an object of the invention to minimize WIP, so that the fabrication process is as efficient as possible.

In accordance with these objectives, the invention is a method of fabricating thin-film magnetic heads wherein parallel rows of thin-film transducers are formed on a wafer, each transducer having a pair of pole tips separated by a throat region along a distance referred to as a throat height, the transducers in each row being identically oriented such that for each transducer the throat region is adjacent to an air-bearing surface side of the corresponding row, the other side of each of the rows being referred to as the rear surface side, the rows being identically oriented such that the air-bearing and rear surface sides of adjacent rows face each other, each of the rows having corresponding lapping guides to be used during a subsequent row-lapping operation. It should be noted that this method of forming a wafer is conventional, and avoids any difficulties associated with having rows with different orientations on the wafer.

Following the step of forming the transducers on the wafer, the wafer is sliced into chunks, each chunk containing a sufficient number of adjacent rows to prevent the chunk from bowing beyond a predetermined tolerance of the throat height when sliced from the wafer, each chunk also having exposed at its opposite sides the air-bearing surface side of one outermost row and the rear surface side of the other outermost row. The number of rows is free to vary as required, but in general is greater than two.

Following the slicing of the wafer into chunks, the invention provides alternative methods of proceeding. Using either method, however, the chunks can be processed in parallel. This feature reduces the amount of WIP required, enhancing process efficiency. According to one aspect of the invention, the following steps are carried out for each of the chunks:

1) bonding a straight edge of a rigid support piece to the exposed air-bearing surface side of the chunk;

2) bonding a straight edge of a rigid carrier piece to the exposed rear side of the chunk;

3) slicing between the row bonded to the rigid carrier piece and its neighboring row, thereby separating the bonded row from the remainder of the chunk, exposing the air bearing surface side of the bonded row for subsequent lapping, and exposing the rear side of the neighboring row remaining on the chunk;

4) lapping the air bearing surface side of the bonded row to an appropriate depth as indicated by the lapping guides;

5) repeating steps 2-4 using either the same or a different rigid carrier piece in step 2 during each repetition, steps 2-4 being repeated until only one row remains in the chunk, the air-bearing surface side of the remaining row still being bonded to the rigid support piece upon the last repetition of step 4;

6) repeating step 2 for the remaining row using either the same or a different rigid carrier piece;

7) separating the remaining row from the rigid support piece; and 8) repeating step 4 for the remaining row.

It will be appreciated that the foregoing per-chunk process is very straightforward, since only 3 steps are repeated for each row in the chunk. It is also very easily scaled to any arbitrary number of rows, thus enabling the bar thickness to be optimized in accordance with the objects of the invention.

In another aspect of the invention, the method includes the following steps:

1) bonding a straight edge of a rigid carrier piece to the exposed rear side of the chunk;

2) lapping the exposed air-bearing surface side of the chunk to an appropriate depth as indicated by the lapping guides on the row whose air-bearing surface side is being lapped;

3) slicing between the lapped row and its neighboring row, thereby separating the lapped row from the remainder of the chunk and exposing the air bearing surface side of the neighboring row for subsequent lapping;

4) repeating steps 2-3 until only one row remains in the chunk, the rear surface side of the remaining row still being bonded to the rigid support piece upon the last repetition of step 3;

5) repeating step 2 for the remaining row; and 6) debonding the remaining row from the rigid carrier piece.

This process is of course even simpler than the first process, since it requires only one bond/debond to a chunk. Both of the foregoing processes are easily scalable to chunks having any number of rows. This feature enables a manufacturing engineer to trade off the amount of bow, chunk processing time, and WIP as necessary. And overall, the same type of process can be used regardless of form factor, thus minimizing tooling and training costs in manufacturing.

BRIEF DESCRIPTION OF THE DRAWINGS

Embodiments of the invention will be described with reference to the accompanying drawings, in which:

FIG. 5 is a set of tables illustrating an expected interrelationship among several variables in slider fabrication processes, the values being based partly on experimental observations of actual fabrication processes;

DETAILED DESCRIPTION

Figure 1:
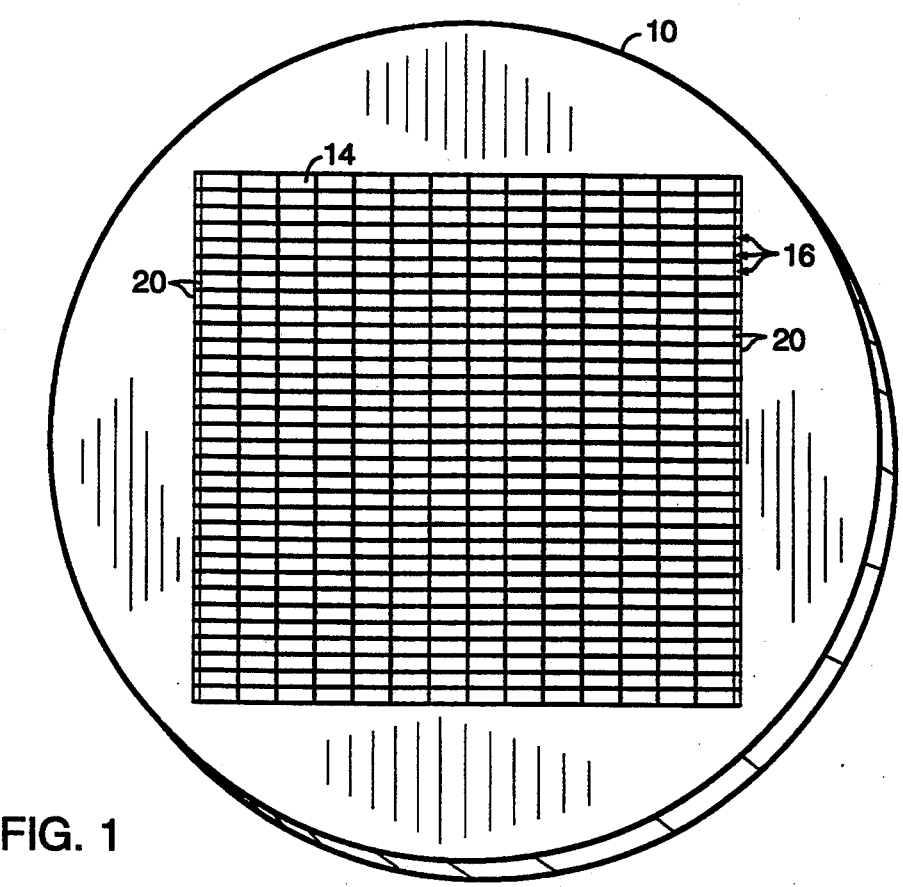
FIG. 1 is a perspective view of a wafer containing an array of thin-film magnetic transducers in accordance with the principles of the present invention.

In FIG. 1, a wafer 10 comprises a wafer substrate made of $Al_2O_3$-TiC covered by a thin layer of $Al_2O_3$. An array of magnetic transducers 14 are formed in this thin layer. The transducers 14 are arranged in identically-oriented rows 16 as shown, each pair of rows 16 being separated by a "street" (not visible in FIG. 1) along which the rows 16 are subsequently divided. The length of the rows 16 is generally a function of the size of the wafer 10, while the number of rows 16 and the number of transducers 14 per row 16 are also related to the form factor of the sliders to be fabricated. For a 70% form factor, a typical 3" round wafer 10 contains approximately 60 rows 16 and 20 pairs of transducers 14 per row, where each transducer pair will be incorporated onto the same slider. For the 50% form factor, a 4" square wafer contains approximately 230 rows of 25 sliders per row.

Also on the wafer 10, although not shown in detail, are conventional lap guides 20 that are formed at opposite ends of the rows 16 for use during lapping of the rows 16.

Figure 2:
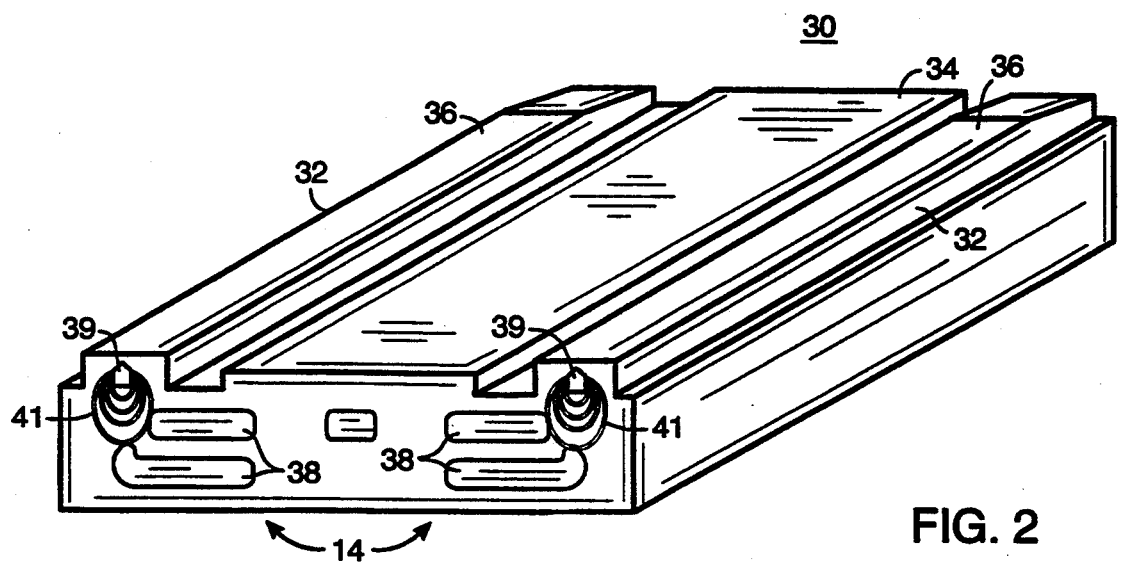
FIG. 2 is a close-up cross-sectional view of a slider produced from the wafer of FIG. 1.

FIG. 2 shows a slider 30, which is a cross-sectional portion of the wafer 10 containing a pair of transducers 14. As will be seen, individual sliders 30 are created by slicing the wafer 10 into separate rows and then separating or "parting off" the sliders 30 from the rows. The slider 30 has two parallel rails 32 on either side of a recessed face portion 34. The top surface 36 of each rail 32 constitutes an air-bearing surface that glides above the surface of a magnetic disk during disk drive operation.

The slider 30 uses the illustrated 2-rail configuration to achieve redundancy of the transducers 14. This redundancy is particularly common in the fabrication of thin-film inductive heads, because each transducer requires only a pair of bonding pads 38. The methods of the current invention, however, may be used with other types of heads, including non-inductive heads. For example, the invention may also be used in the fabrication of magneto-resistive or MR heads, which employ a single MR element instead of a pair of magnetic poles. However, MR heads require 4 bonding pads per transducer, so that an MR slider that is comparable in size to the illustrated slider 30 would have only one MR transducer rather than a redundant pair.

The transducers 14 may be formed by a conventional photolithography process. Each transducer 14 includes a coil 41 and poles 39 that terminate at their upper ends on the corresponding rail surface 36. The region between the tips of the poles 39 is called the "throat", and the length of this region perpendicular to the air-bearing surface is referred to as the "throat height" of the corresponding transducer 14. In current slider technology, the final throat height is on the order of a few microns, and its allowable deviation is on the order of a few tenths of microns. This final throat height is achieved in a manner described in greater detail below.

Figure 3:
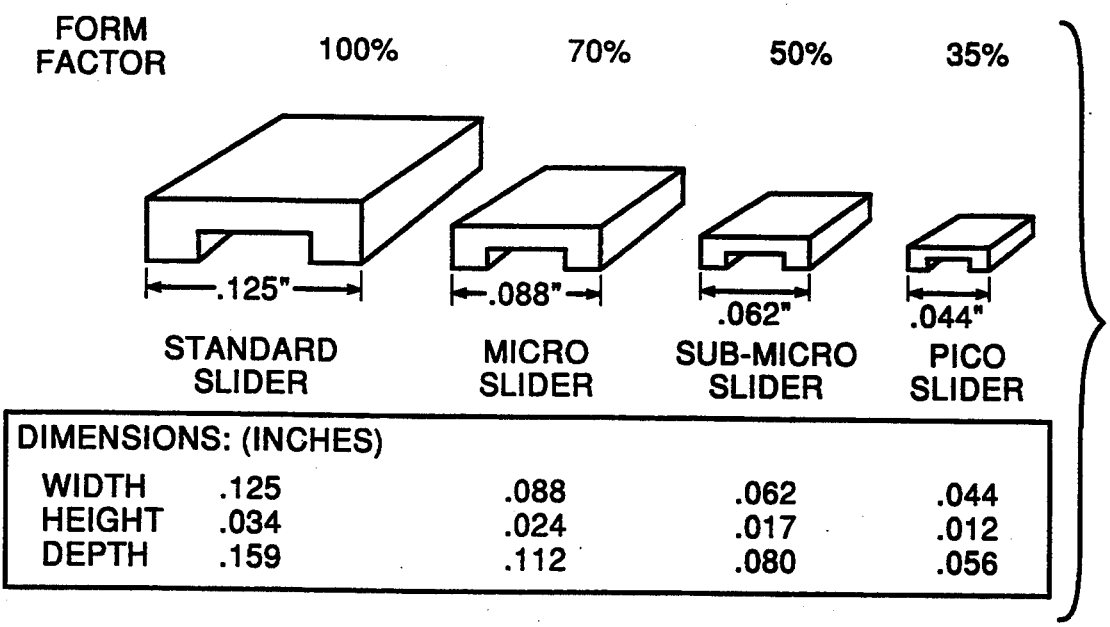
FIG. 3 is a diagram of several sliders like that of FIG. 2 varying in size by standard form factors.

FIG. 3 shows several sliders of different standard form factors, and also shows their corresponding dimensions. As can be seen, all the linear dimensions of the slider are scaled by the form factor relative to the standard or 100%-form-factor slider. It is this variability in slider size, as well as the tendency of disk drive products to use ever-smaller sliders, that has given rise to the present invention.

Figure 4:
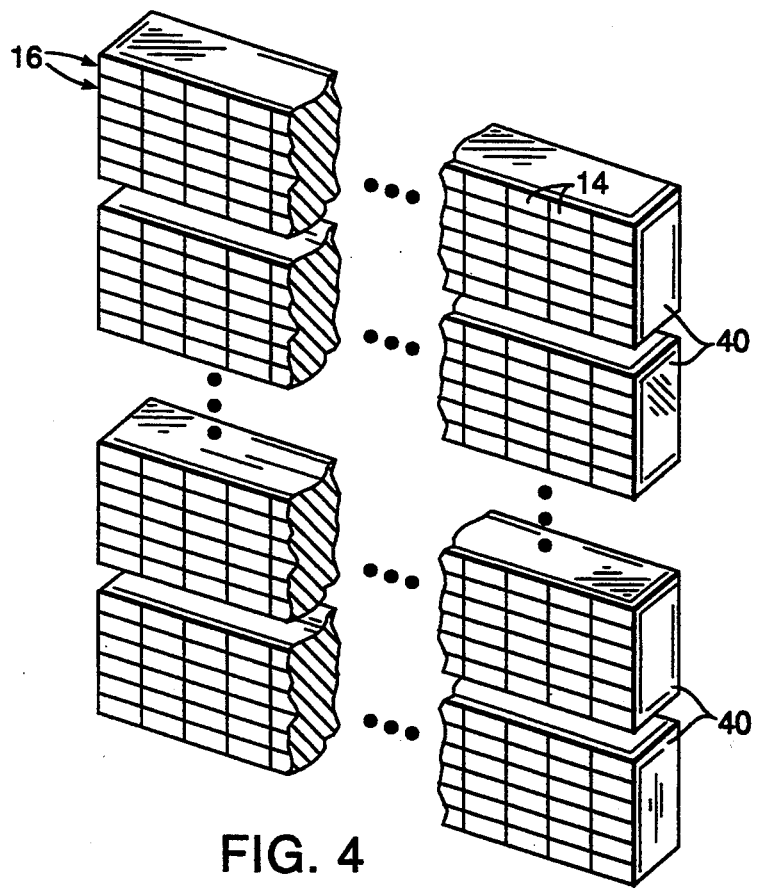
FIG. 4 shows a number of row chunks resulting after slicing the wafer of FIG. 1.

Turning now to FIG. 4, the first step in processing the wafer 10 is to slice it into multiple chunks or bars 40, each containing at least some minimum number of rows 16. This step can be achieved in a conventional manner, including slicing the wafer 10 with a ganged-wheel slicer. As mentioned above, the important factor affecting bow is the thickness of the chunks 40; the minimum number of rows 16 is thus chosen to yield a minimum chunk thickness. In turn, the minimum chunk thickness is a fairly complicated function of the row length, slider form factor, and the allowable deviation of throat height due to slicing. The interdependence of these factors is explained in detail below.

To begin with, the average throat height deviation across a row 16 in a bar 40 is approximately $0.30 \times B$, where B represents the maximum displacement of the bar 40 from a straight line due to bowing. This relationship arises due to the quadratic nature of bowing-induced displacement with respect to location on the bar 40. The applicant's empirical studies of slider fabrication processes also show that, for a given row width (which is a function of slider form factor), bow decreases exponentially as the number of rows in a chunk increases. This relationship can be expressed as follows:

$$Box(n) = B_{lim} + (B_1 - b_{lim})e^{-(n-1)}$$

where "n" is the number of rows, $B_1$ is a typical maximum bow for a one-row bar, and $B_{lim}$ represents a practical minimum amount of bowing as the number of rows becomes very large. $B_1$ and $B_{lim}$ are functions of both the row length and the slider form factor. Values for $B_1$ and $B_{lim}$ are necessarily very process-specific, because they encompass numerous process effects, such as the manner in which bonding, slicing, and other process steps are performed. The applicant has nonetheless determined the following approximate values for $B_1$ and $B_{lim}$ based on experimental observation of 70% and 50% form factor fabrication processes:

$$B_{lim} = (4.8 \times 10^{-2})(L/F) + 0.17$$

$$B_1 = (7.6 \times 10^{-1})(L/F) - 0.16$$

where L is row length in inches, F is the form factor, and the resulting units of $B_1$ and $B_{lim}$ are microns. Putting all of the foregoing relationships together, an expression for approximate average throat height deviation in microns due to bowing is as follows:

$$(0.014)(L/F) + 0.05 + [(0.21)(L/F) - 0.1]e^{-(n-1)}$$

Values for this function are tabulated in FIG. 5 for the form factors 0.7, 0.5, and 0.35. As is evident from the tables, the number of rows necessary to achieve a given average throat height deviation depends both on row length and on the form factor. As the rows lengthen, more rows are needed. Likewise, as the form factor decreases, more rows are needed.

The above-described relationships describe only throat height deviation caused by bow. As mentioned above, there are other factors such as lapping mechanics and imperfect deposition that also contribute to such deviation; these contributions are not captured by the tables of FIG. 5.

In light of the foregoing, it is clear that the minimum number of rows 16 appearing in each chunk 40 must be determined based upon the desired throat height deviation. The above-described relationships can serve as a useful guide in this determination.

Upon completion of the slicing step of FIG. 4, a number of chunks 40 having no more than an acceptable degree of bow have been formed. These chunks are then further sliced into rows in one of two ways, each of which is described below.

Figure 6:
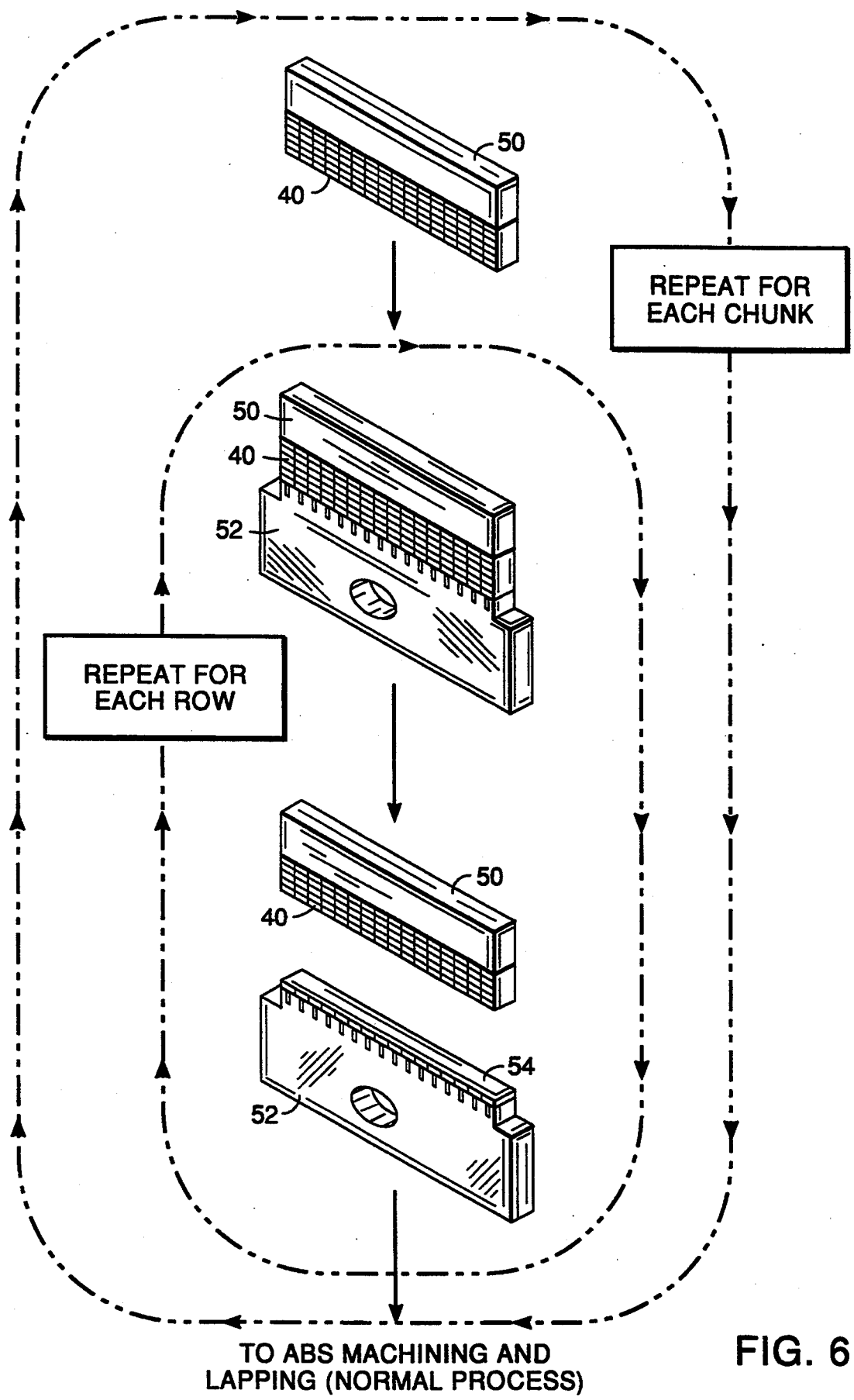
FIG. 6 shows how each chunk of FIG. 4 is processed to obtain lapped rows for one embodiment of the present invention.

FIG. 6 shows a first method of slicing the chunks 40, the process being repeated for each chunk 40 of FIG. 4. First, the air-bearing surface side of the chunk 40 is bonded to a rigid support piece 50 using permanent thermo-set adhesive. The support piece 50 may conveniently be formed from the same material as the wafer 10. The support piece 50 allows the chunk 40 to be clamped during a subsequent slice, but more importantly, it also allows the chunk 40 to maintain its original straightness through the subsequent bonding and slicing iterations of FIG. 6.

The supported chunk assembly is then bonded to a regular row tool carrier 52 using conventional bonding techniques, such as by using thermo-plastic temporary adhesive. The row 54 that is bonded to the carrier 52 is then sliced off using a precision single-wheel slicer. Because the straightness of the chunk has been maintained, this row 54 can be sliced very close to final throat height. This feature has the advantage that there is less material to be subsequently ground and lapped away, thus further enhancing process efficiency. Also, the bonded row 54 has had its straightness preserved, so that throat height deviation upon completion of grinding and lapping is minimized in accordance with the objects of the invention.

After being sliced from the chunk 40, the bonded row 54 is then subjected to normal machining of the exposed air-bearing surface; this includes subsequent grinding and lapping. These steps may be carried out in any of a variety of conventional ways. Because only one row 54 is tied up during this machining process, the amount of WIP is minimized in accordance with the objects of the invention.

The steps of bonding the carrier 52 to the outermost row and slicing the bonded row off are repeated for each row in the chunk 40. During each repetition, either the same or a different carrier 52 may be used, depending on the nature of subsequent processing steps. During the last repetition, the last row 16 is sliced from the support piece 50. The other side of the support piece 50 may be used to support another chunk 40 before being subsequently discarded or re-worked.

Figure 7:
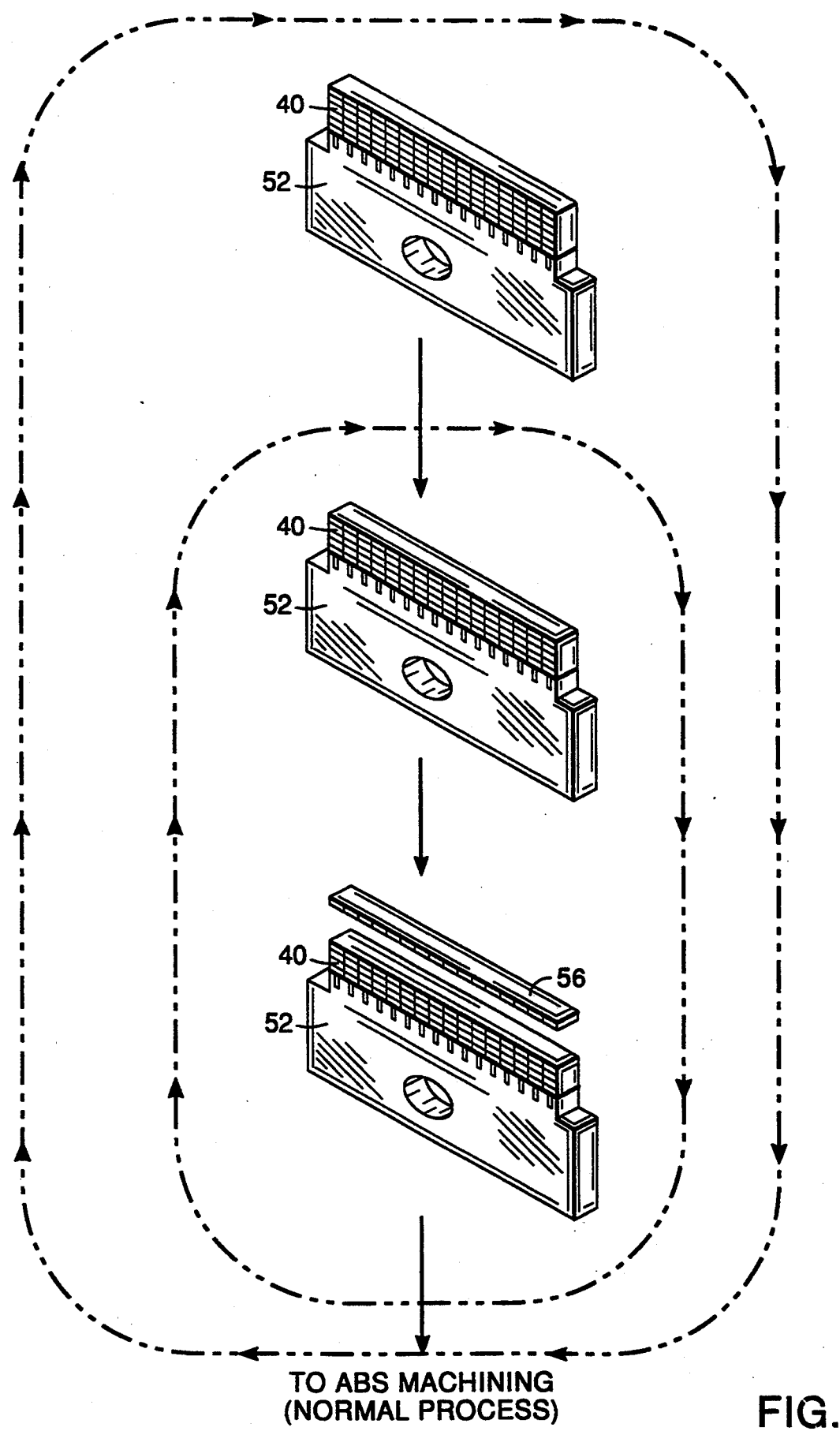
FIG. 7 shows how each chunk of FIG. 4 is processed to obtain lapped rows for another embodiment of the present invention.

FIG. 7 shows an alternative method of processing the chunks 40 of FIG. 4. In contrast to the method of FIG. 6, each chunk 40 is bonded only once, directly to the carrier tool 52. This bond is a temporary bond. The outer row 56 on this bonded chunk assembly is then lapped, and then sliced off the chunk 40. This sliced row 56 is then subjected to the remainder of the normal fabrication process, including "parting off" or separating the individual sliders 30 for further assembly. After the last row has been lapped, it is debonded from the carrier 52 using chemical solvents.

What has been shown herein are two specific methods of processing wafers to yield precisely-lapped rows of sliders, both methods relying on an initial step of slicing the wafer into appropriately-sized chunks. While the illustrated methods therefore embody the principles of the present invention, there may be other embodiments as well that are intended to be described the following claims.

What is claimed is:

1. A method of fabricating thin-film magnetic sliders, comprising the steps of:

forming parallel rows of thin-film transducers on a wafer, each of said rows having an air-bearing surface side and a rear surface side, each of said transducers having a pair of pole tips separated by a throat region along a distance referred to as a throat height, the transducers in each row being identically oriented such that for each transducer said throat region is adjacent to an air-bearing surface side of the row in which it is contained, said rows being identically oriented such that the air-bearing and rear surface sides of adjacent rows face each other, each of said rows having lapping guides to be used during a subsequent row-lapping operation;

slicing said wafer into chunks, each chunk containing a sufficient number of adjacent rows to prevent the chunk from bowing beyond a predetermined tolerance of said throat height when sliced from said wafer, each chunk having exposed at its opposite sides the air-bearing surface side of one outermost row and the rear surface side of the other outermost row; and for each of said chunks, carrying out the following steps:

1) bonding a straight edge of a rigid support piece to the exposed air-bearing surface side of the chunk;

2) bonding a straight edge of a rigid carrier piece to the exposed rear side of the chunk;

3) slicing between the row bonded to said rigid carrier piece and its neighboring row, thereby separating said bonded row from the remainder of the chunk, exposing the air bearing surface side of the bonded row for subsequent lapping, and exposing the rear side of said neighboring row remaining on said chunk;

4) lapping said air bearing surface side of said bonded row to an appropriate depth as indicated by said lapping guides;

5) repeating steps 2–4 using either the same or a different rigid carrier piece in step 2 during each repetition, steps 2–4 being repeated until only one row remains in said chunk, the air-bearing surface side of the remaining row still being bonded to said rigid support piece upon the last repetition of step 4;

6) repeating step 2 for the remaining row using either the same or a different rigid carrier piece;

7) separating the remaining row from said rigid support piece; and 8) repeating step 4 for the remaining row.

2. A method according to claim 1, wherein the initial number of rows in each chunk is greater than two.

3. A method according to claim 2, wherein the form factor of the sliders contained in each of said rows is 0.7, and the initial number of rows in each chunk is six.

4. A method according to claim 2, wherein the form factor of the sliders contained in each of said rows is 0.5, and the initial number of rows in each chunk is eight.

5. A method according to claim 1, wherein step 7 comprises the step of slicing the remaining row from said rigid support piece.

6. A method according to claim 1, wherein for each row said lapping guides are located near the opposite ends thereof.

7. A method of fabricating thin-film magnetic heads, comprising the steps of:

forming parallel rows of thin-film transducers on a wafer, each of said transducers having a pair of pole tips separated by a throat region along a distance referred to as a throat height, the transducers in each row being identically oriented such that for each transducer said throat region is adjacent to an air-bearing surface side of the corresponding row, the other side of each of said rows being referred to as the rear surface side, said rows being identically oriented such that the air-bearing and rear surface sides of adjacent rows face each other, each of said rows having corresponding lapping guides at its opposite ends to be used during a subsequent row-lapping operation;

slicing said wafer into chunks, each chunk containing a sufficient number of adjacent rows to prevent the chunk from bowing beyond a predetermined tolerance of said throat height when sliced from said wafer, each chunk having exposed at its opposite sides the air-bearing surface side of one outermost row and the rear surface side of the other outermost row; and for each of said chunks, carrying out the following steps:

1) bonding a straight edge of a rigid carrier piece to the exposed rear side of the chunk;

2) lapping said exposed air-bearing surface side of the chunk to an appropriate depth as indicated by the lapping guides on the row whose air-bearing surface side is being lapped;

3) slicing between said lapped row and its neighboring row, thereby separating said lapped row from the remainder of the chunk and exposing the air bearing surface side of the neighboring row for subsequent lapping;

4) repeating steps 2–3 until only one row remains in said chunk, the rear surface side of the remaining row still being bonded to said rigid support piece upon the last repetition of step 3;

5) repeating step 2 for the remaining row; and 6) debonding the remaining row from said rigid carrier piece.

8. A method according to claim 7, wherein the initial number of rows in each chunk is greater than two.

9. A method according to claim 8, wherein the form factor of the sliders contained in each of said rows is 0.7, and the initial number of rows in each chunk is six.

10. A method according to claim 8, wherein the form factor of the sliders contained in each of said rows is 0.5, and the initial number of rows in each chunk is eight.

11. A method according to claim 7, wherein for each row said lapping guides are located near the opposite ends thereof.

* * * * *